2,849,503
GEOMETRIC ISOMERS OF 1,3-DICHLORO-BUTADIENE

Kenneth C. Eberly, Akron, and Robert J. Reid, Canal Fulton, Ohio, assignors to The Firestone Tire & Rubber Company, Akron, Ohio, a corporation of Ohio No Drawing. Application December 23, 1953
Serial No. 400,129

3 Claims. (Cl. 260—655)

This invention relates to the two geometric isomers of 1,3-dichloro-1,3-butadiene. The isomers and mixtures thereof are readily polymerized, and the resulting polymers and also copolymers of the isomers with other monomers such as 2,3-dichloro-1,3-butadiene, etc., form valuable products. The isomers are stabilized by phenyl-beta-naphthylamine, etc., and are then useful as solvents, soil fumigants, intermediates for the production of valuable final products, etc. Neither isomer forms a Diels-Alder reaction product with maleic anhydride, as does 2,3-dichloro-1,3-butadiene.

1,3-dichloro-1,3-butadiene is obtainable by dehydrohalogenation of 1,3,4-trichloro-1-butene, each separate isomer being obtainable from the corresponding isomer of the 1,3,4-trichloro-1-butene, and a mixture of the isomers being obtainable from a mixture of the trichlorobutene isomers. The two dichlorobutadiene isomers are distinguished herein by describing them as the low-melting and high-melting isomers, and these are obtainable, respectively, from the low-melting and high-melting 1,3,4-trichloro-1-butene isomers.

The butene isomers are obtainable by pyrolytic decomposition of 1,2,3,4-tetrachlorobutane. The following procedure is illustrative:

PREPARATION OF 1,3,4-TRICHLORO-1-BUTENE

Ten thousand eight hundred ninety grams of pure solid 1,2,3,4-tetrachlorobutane (M. P. 73–4° C.) were melted and run into a steel furnace tube 10 feet long and 2 inches in diameter. Thermocouples welded to the outside of the tube at 2-foot intervals showed readings of 283–318° C. (thermostat nearest inlet), 302–380° C., 401–465° C., and 516–612° C. (thermostat nearest outlet). The run took 9½ hours and yielded 6157 grams of black liquid. Considerable 1-chloro-1-butene-3-yne and 1,3-butadi-yne were lost as vapors. Some carbon was deposited in the tube.

The crude black liquid obtained as above described was subjected to a first rough fractionation at progressively lower pressures. A fraction coming over in the range 75–94° C. under 22 mm. absolute pressure and amounting to 977.9 grams was taken as a crude material for further fractionation.

This crude material was then more carefully fractionated in a column 93 cm. in height by 2.2 cm. inside diameter and arranged to provide a reflux ratio of 5 to 15:1. The pressure in the column was kept at 10 mm. throughout the distillation. The following fractions were obtained:

| Fraction No. | Temperature, ° C. | Amount of fraction, g. | Melting point of fraction, ° C. |
|---|---|---|---|
| 1 | 41.4 | 90.55 | −65 to −60 |
| 2 | 52 | 205.9 | −51 |
| 3 | 55.5 | 315.6 | −14.5 |
| 4 | 65 | 135.2 | <−80 |

Fractions Nos. 2 and 3 were taken as low and high melting 1,3,4-trichloro-1-butene, respectively.

PREPARATION OF DICHLORO BUTADIENES

Low-melting 1,3-dichloro-1,3-butadiene

Fifty-four and six-tenths grams of low-melting 1,3,4-trichloro-1-butene, 1 gram of phenyl-beta-naphthylamine, and 200 cc. of methanol were charged into a one-liter three-necked flask fitted with nitrogen inlet, dropping funnel, and low fractionating column (with condenser). Twenty and five-tenths grams (50 percent excess) of sodium hydroxide as a 50 percent aqueous solution was put into the dropping funnel. The air was swept from the flask by a slow current of nitrogen while the contents of the flask were brought to a gentle boil. The sodium hydroxide was then added at such a rate that the reaction did not become violent (0.33 hours). Simultaneously, the methanol and 1,3-dichloro-1,3-butadiene were distilled off at 63.4° C. with no reflux returned. In one hour 205 cc. of distillate had been collected and the reaction was terminated. The methanolic distillate was treated with a 9 perecnt solution of sodium chloride (440 cc.) in a separatory funnel and 35.9 grams of a heavy organic liquid came down. It was drawn off, dried, and fractionated. Almost all of the material boiled near 39° C. at 50 mm. The yield was 85 percent of theory.

Low-melting 1,3-dichloro-1,3-butadiene is a colorless, water-immiscible liquid having the following physical properties: boiling point, 39° C. (50 mm.); melting point, −89° C.; $d_4^{20}$, 1.202; $N_D^{20}$, 1.4916.

*Analysis.*—Calcd. for $C_4H_4Cl_2$: Cl, 57.66. Found: Cl, 57.60.

In the course of one to two days at room conditions the material polymerized to a dark-colored taffy with copious evolution of hydrogen chloride. The polymer is valuable as an extender in plastic materials, etc. On copolymerization with other monomers various valuable products are obtained. The low-melting isomer fails to undergo the Diels-Alder reaction with 1,4-naphthoquinone, even in the presence of an accelerator such as diamylamine.

High-melting 1,3-dichloro-1,3-butadiene

The high-melting isomer is obtained in the same manner from high-melting 1,3,4-trichloro-1-butene. It has the following physical properties: boiling point, 41.5° C. (50 mm.); melting point, −66° C.; $d_4^{20}$, 1.196; $N_D^{20}$, 1.5063.

*Analysis.*—Calcd. for $C_4H_4Cl_2$: Cl, 57.66. Found: Cl, 57.61.

In the course of one to two days at room conditions this isomer polymerized spontaneously with considerable darkening and copious evolution of hydrogen chloride. It is valuble as an extender in plastic materials, etc. On copolymerization with other monomers various valuable products are obtained.

DIELS-ALDER REACTION

Although the low-melting isomer does not react with 1,4-naphthoquinone, the high-melting isomer produces such a reaction product which on oxidation and loss of one molecule of hydrogen chloride, yields 2-chloroanthraquinone.

A mixture of 15.0 grams of high-melting, 1,3-dichloro-1,3-butadiene, 9.7 grams of 1,4-naphthoquinone, 0.05 gram of phenyl-beta-naphthylamine, 0.3 gram of diamylamine and 60 cc. of benzene was heated at 50–60° C. under reflux for 8.5 hours. During the heating period the whole darkened, and dirty crystals deposited. After the heating period was completed, the whole was allowed to evaporate spontaneously to dryness yielding 14.3 grams of a blue-black solid (Diels-Alder adduct and unreacted 1,4-naphthoquinone). The solid was slowly added to a slurry of 45 grams of chromium trioxide in 200 cc. of glacial acetic acid kept at 50–60° C. There was some heat of reaction evolved, and the addition required roughly one hour. The whole was allowed to set one hour after the addition was completed, then it was poured into 800 cc. of water. A yellow solid separated which was filtered off, washed, and dried (wt., 2.5 grams). The yellow solid was sublimed in high vacuum at 170–80° C., yielding beautiful golden-yellow crystals melting at 205° C. (unc.). A mixture of these crystals with an authentic sample of 2-chloroanthraquinone melted at 205° C. (unc.), showing that the crystals obtained were 2-chloroanthraquinone. *Analysis.*—Calcd. for $C_{14}H_7O_2Cl$; Cl, 14.61. Found: Cl, 14.71.

This application is a continuation-in-part of application Serial No. 64,233, filed December 8, 1948, now abandoned.

What we claim is:
1. A 1,3-dichloro-1,3-butadiene.
2. Low-melting 1,3-dichloro-1,3-butadiene isomer.
3. High-melting 1,3-dichloro-1,3-butadiene isomer.

References Cited in the file of this patent

UNITED STATES PATENTS

| | | |
|---|---|---|
| 1,998,442 | Carothers et al. | Apr. 23, 1935 |
| 2,445,738 | Willert | July 10, 1948 |